United States Patent
Dai

(10) Patent No.: US 11,110,609 B2
(45) Date of Patent: Sep. 7, 2021

(54) METHOD FOR CONTROLLING A ROBOT ARM

(71) Applicant: ABB Schweiz AG, Baden (CH)

(72) Inventor: Fan Dai, Zwingenberg (DE)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 17/029,064

(22) Filed: Sep. 23, 2020

(65) Prior Publication Data

US 2021/0001492 A1   Jan. 7, 2021

Related U.S. Application Data

(63) Continuation of application No. PCT/EP2018/059700, filed on Apr. 17, 2018.

(51) Int. Cl.
*B25J 9/16* (2006.01)
*B25J 13/08* (2006.01)

(52) U.S. Cl.
CPC ........... *B25J 9/1697* (2013.01); *B25J 9/1692* (2013.01); *B25J 13/088* (2013.01); *G05B 2219/39011* (2013.01); *G05B 2219/39397* (2013.01)

(58) Field of Classification Search
CPC .......... B25J 9/1697; B25J 9/1692; G05B 2219/39011; G05B 2219/39397; G05B 2219/39008; G05B 2219/39016; G05B 2219/39024; G05B 2219/39046; G05B 2219/39391; G05B 2219/39395; G05B 2219/40425

See application file for complete search history.

(56) References Cited

U.S. PATENT DOCUMENTS

2012/0307027 A1* 12/2012 Popovic ................ G06T 7/246
                                                        348/65
2013/0041508 A1   2/2013 Hu et al.

FOREIGN PATENT DOCUMENTS

EP     1587162 A1    10/2005
EP     3088843 A1    11/2016

OTHER PUBLICATIONS

Sutanto et al., "The role of exploratory movement in visual servoing without calibration", 1998, Elsevier, Robotics and Autonomous Systems 23, pp. 153-169 (Year: 1998).*

* cited by examiner

*Primary Examiner* — Spencer D Patton
(74) *Attorney, Agent, or Firm* — Leydig, Voit & Mayer, Ltd.

(57) ABSTRACT

A method for visually controlling a robot arm which is displaceable in a plurality of degrees of freedom, the robot arm carrying at least one displaceable reference point, includes the steps of: a) placing at least one camera so that a target point where the reference point is to be placed is contained in an image output by the at least one camera; b) displacing the robot arm so that the reference point is within the image; c) determining a vector which, in the image, connects the reference point to the target point; d) choosing one of the plurality of degrees of freedom, moving the robot arm by a predetermined standard distance in the one degree of freedom, and recording a standard displacement of the reference point within the image resulting from the movement of the robot arm; e) repeating step d) at least until the vector can be decomposed.

13 Claims, 2 Drawing Sheets

METHOD FOR CONTROLLING A ROBOT ARM

CROSS-REFERENCE TO PRIOR APPLICATION

This application is a continuation of International Patent Application No. PCT/EP2018/059700, filed on Apr. 17, 2018, the entire disclosure of which is hereby incorporated by reference herein.

FIELD

The present invention relates to a method for visually controlling a robot arm which is displaceable in a plurality of degrees of freedom. Visually controlling displacement of a robot is highly attractive, since it allows to steer a robot precisely even if the reproducibility of the robot's reaction to a given steering command is low.

BACKGROUND

Whenever a robot system comprising a robot arm, at least one camera and a controller coupled to said robot arm and camera for controlling the robot arm based on input from the camera is newly set up, and the position of the camera with respect to the robot arm is not precisely defined in advance, there is a problem in that although the controller may be able to identify a deviation between the actual position of a reference point carried by the robot arm and a target point where the reference point should be placed, it cannot know how to move the robot arm in order to reach the target point.

Conventionally this knowledge is introduced into the controller by a process known as calibrating the camera, which, if performed manually, requires a large amount of highly skilled labour. Since manual calibration is time-intensive, it must be carried out before the robot system starts normal operation, and must then enable proper operation of the robot arm for any target point in space where it might become necessary to move the robot arm to.

SUMMARY

In an embodiment, the present invention provides a method for visually controlling a robot arm which is displaceable in a plurality of degrees of freedom, the robot arm carrying at least one displaceable reference point, the method comprising the steps of: a) placing at least one camera so that a target point where the reference point is to be placed is contained in an image output by the at least one camera; b) displacing the robot arm so that the reference point is within the image; c) determining a vector which, in the image, connects the reference point to the target point; d) choosing one of the plurality of degrees of freedom, moving the robot arm by a predetermined standard distance in the one degree of freedom, and recording a standard displacement of the reference point within the image resulting from the movement of the robot arm; e) repeating step d) at least until the vector can be decomposed into a sum of standard displacements times associated weighting factors; and f) moving the robot arm by the weighting factors times the standard distances associated with the standard displacements of the sum.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
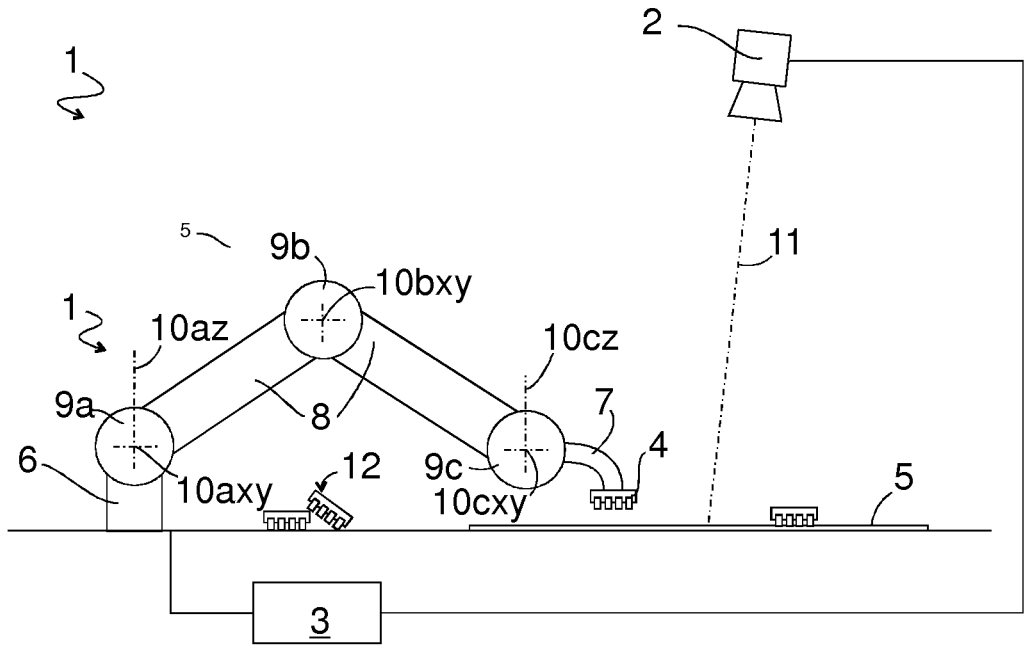
FIG. 1 is a schematic view of the robot system of the invention.

In an embodiment, the present invention provides a robot system and method for visually controlling a robot arm that do not require manual calibration.

In an embodiment, the present invention provides a method for visually controlling a robot arm which is displaceable in a plurality of degrees of freedom, the robot arm carrying at least one displaceable reference point, which method comprises the steps of a) placing at least one camera so that a target point where the reference point is to be placed is contained in an image output by the camera;

b) displacing the robot so that the reference point is within the image;

c) determining a vector which, in the image, connects the reference point to the target point;

d) choosing one of the degrees of freedom, moving the robot by a predetermined standard distance in said degree of freedom and recording a standard displacement of the reference point within the image resulting from the movement of the robot;

e) repeating step d) at least until the vector can be decomposed into sum of standard displacements times associated weighting factors;

f) moving the robot by the weighting factors times the standard distances associated to the standard displacements of the sum.

The standard displacements recorded in step d) can be regarded as basis vectors which span a vector space. This vector space is the plane of the image, i.e. it is two-dimensional. Therefore, in order to find standard displacements which can be combined to form the vector of step c), in most cases only a small number of iterations of step d) will be sufficient, regardless of the number of degrees of freedom of the robot. Therefore, the most promising degrees of freedom can be chosen first in step d), and if the vector of step c) can be formed by combining the standard displacements thus obtained, time can be saved by not investigating the remaining degrees of freedom.

The method of the present invention enables a precise control of the robot's movement only in close vicinity to the target point, where the displacement of the reference point that results from moving the robot by a predetermined standard distance in a given degree of freedom can be approximated as directly proportional to the standard distance, and therefore must be measured anew whenever there is a substantial change in the reference point or the target point. In practice, this is not a disadvantage, since redoing the measurements and processing these is a matter of seconds that does not noticeably delay the operation of the robot.

The degrees of freedom that are considered in the above method can be defined quite freely. Any coordinate of the reference point that can be varied can be regarded as a degree of freedom. This can be a coordinate in a coordinate system which is defined without regard to the structure of the robot, e.g. a Cartesian coordinate system in which there are translational degrees of freedom in two or three dimensions and one or three rotational degrees of freedom, depending on whether the coordinate system has two or three dimensions. In such a coordinate system, displacing the reference point in one degree of freedom only may require a coordinated operation of several actors of the robot arm, the proportions of their respective displacements depending on the current position of the reference point.

Alternatively, if a robot has a plurality of actors, each of which drives a displacement of one joint, each such displacement can be regarded as degree of freedom. In that case the movement of the reference point in two- or three-dimensional space caused by such a displacement of a single actor will depend on the positions of other actors.

Step d) may be carried out for all degrees of freedom of the robot. Although this takes more time than the above-mentioned alternative of merely trying as many degrees as necessary for forming the vector of step c) by a linear combination of standard displacements, it has an advantage in that in the end, the movement of step f) can be chosen so as to minimize an unwanted displacement along the optical axis of the camera.

To this effect, a second camera may be provided whose optical axis is not parallel to that of the first camera and which can "see" a displacement along the optical axis of the first camera; in that case, what can be recorded in step d) is not only the standard displacement of the reference point within the image of the first camera, but also its displacement along the optical axis, and the standard displacements and their associated weighting factors can be chosen in step e) so that they yield a movement of the reference point in a plane perpendicular to the optical axis of the first camera.

Alternatively, it can be assumed that if the robot is moved by a predetermined standard distance in a given degree of freedom, and the resulting standard displacement of the reference point within the image is much smaller than in case of other degrees of freedom, then the movement in said given degree of freedom can be assumed to be substantially along the optical axis of the camera. In order to avoid a substantial movement along the optical axis in step f), the weighted sum of step d) should comprise no addends associated to a degree of freedom directed substantially along the optical axis.

In most practical cases, the reference point not only has to be placed precisely onto the target point, but shall also have a desired orientation, i.e. not only a translation but also a rotation of the reference point has to be controlled. To this effect, the robot arm may carry a second displaceable reference point, and the vector may comprise a rotation component specifying a rotation by which a line extending between first and second reference points is made parallel to a line extending between the first and a second target points.

The reference point can be located on a component of the robot arm, typically an end effector thereof, or on an object which is being manipulated by the robot arm and is e.g. held by the end effector.

According to a preferred application, the object is a circuit component and the target point is on a circuit board where the circuit component is to be installed.

Here, the field of view of the camera should cover a surface of the circuit board, and a degree of freedom chosen in step d) should preferably be parallel to said surface, in order to avoid a premature contact of the circuit component with the circuit board or with components that have already been placed thereon.

The object is further achieved by a robot system comprising a robot arm, at least one camera and a controller coupled to said robot arm and camera, wherein the controller is programmed to carry out the method as defined above.

The invention can further be embodied in a computer program product comprising program code means which enable a computer to carry out the method as defined above, or in a computer-readable data carrier, having program instructions stored on it which enable a computer to carry out the method.

FIG. 1 is a schematic view of a robot system comprising a robot arm 1, a camera 2 and a controller 3. The robot system is used for placing components 4 on a—preferably planar—support, e.g. circuit components 4 on a circuit board 5.

The robot arm 1 comprises a stationary base 6, an end effector 7 and a plurality of elongate links 8 that are pivotably connected to one another, to the base 6 and the end effector 7 by joints 9a-c. Each joint can have one or more degrees of rotational freedom. For illustration purposes, it will be assumed that the joint 9a adjacent to the base is rotatable by a vertical axis $10az$ and by a horizontal axis $10axy$ which rotates around axis $10az$ along with the links 8, joint 9b rotates around an axis $10bxy$ parallel to $10axy$, and joint 9c rotates around an axis $10cxy$ parallel to $10axy$ and an axis $10cz$ which in the configuration of FIG. 1 happens to be maybe vertical but is in fact pivotable around axis $10cxy$.

The camera 2 has been installed above circuit board 5 so that the circuit board 5 is inside the field of view of the camera 2. The circuit board 5 defines a three-dimensional Cartesian coordinate system, in which two axes x, y extend in the plane of the circuit board 5, e.g. along its edges, and a third axis, z, is perpendicular to the circuit board. The camera 2 defines a second Cartesian coordinate system with two axes x', y' extending in the image plane of the camera 2, and a third axis z' is the optical axis 11 of the camera 3. Although care may have been taken to align the axes of the two coordinate systems roughly parallel to each other when installing the camera, some inaccuracy of alignment is inevitable, so that a matrix that transforms one coordinate system into the other can be regarded as unknown.

The controller 3 receives angle data from all joints 9, stores geometry data relating to the links 8 and the end effector 7 and can thus calculate the position of a specific reference point of end effector 7.

Therefore a coarse positioning of end effector 7 is possible without using data from the camera 2. Such open-loop positioning accuracy may be sufficient to steer robot arm 1 into an appropriate position for seizing a circuit component 4 from a supply 12 without feedback from the camera 2 and for bringing the circuit component 4 into a preliminary position close to a target position 13 on circuit board 5, so that both the circuit component 4 and its target position 13 are within a field of view of the camera 2.

However, accuracy of the preliminary position cannot be better than the positioning accuracy of actors that drive the rotations of the joints 9 based on target data from the controller 3 or of sensors of the robot arm 1 which measure the angles the joints 9 actually assume due operation of the actors. Obviously, the closer a joint 9 is to the base 6, the higher is the impact of any angle inaccuracy of this joint on the actual position of the end effector 7. Further, the position of a reference point 14 on component 4 may vary with respect to the end effector 7, since the circuit component 4 can be seized by the end effector 7 at different locations and in various orientations.

In order to take account of these variations, and in order to place the component 4 precisely and in correct orientation at the target position 13, the robot arm 1 must be controlled in a closed-loop based on images from camera 2.

Figure 2:
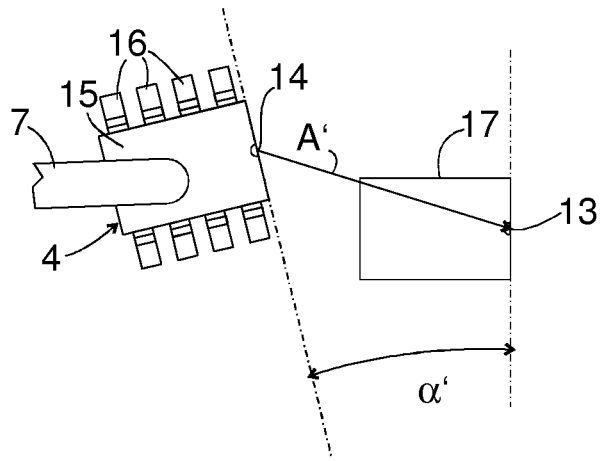
FIG. 2 illustrates an image obtained by the camera of the robot system of FIG. 1.

FIG. 2 is an example of an image provided by the camera 2. The image shows part of the end effector 7, the circuit component 4 attached to the end effector, and the target position 13. The circuit component 4 of this example is a chip having a rectangular plastic casing 15 and contacts 16 extending from the longer sides of the casing 15. The reference point 14 can be a notch formed at a shorter side of casing 15. In the image of FIG. 2, the notch is visible; if the circuit component 4 had been seized in another orientation, it might be hidden from the camera 2 under the end effector 7, but in that case the controller would nevertheless be able to calculate its position in the image based on the visible edges of the casing 15.

On circuit board 5, there is a rectangular outline 17 that matches the shape of casing 15. A mark on of the shorter edges of the outline 17 defines the target position 13. The circuit component 4 is placed correctly on the circuit board when its reference point 14 is placed on the target position 13, and the outline of casing 15 matches the outline 17. So, in order to place the circuit component 4 correctly, the robot arm 1 has to displace it by a vector A' and rotate it by an angle α'.

While the relation between the coordinate systems x,y,z of the robot arm 1 and x', y',z' of the camera 2 is still unknown, there is no way for the controller 3 to tell how far and in what direction the circuit component 4 will be displaced in images from the camera 2 in response to a given movement of the robot arm 1.

What the controller 3 can tell, based on the known geometry of the robot arm 1, is that a rotation around axis 10$az$ will displace the circuit component in a first direction in the xy plane, parallel to circuit board 5, whereas a rotation around one of axes 10$axy$,10$bxy$ will cause a displacement which is part in a second direction in the xy plane and part in the z direction, and a rotation around axis 10$cxy$ will displace the circuit component substantially in the z direction only.

According to a first embodiment of the method of the invention, the controller selects in step S1 one of the axes 10, e.g. axis 10$az$, and drives a rotation around this axis by a small angle 4$az$ (S2). The angle can be fixed and identical for all axes 10, preferably it is inversely proportional to the distance of end effector 7 from the selected axis, so that the distance travelled by the end effector 7 is substantially equal for all axes.

Figure 3:
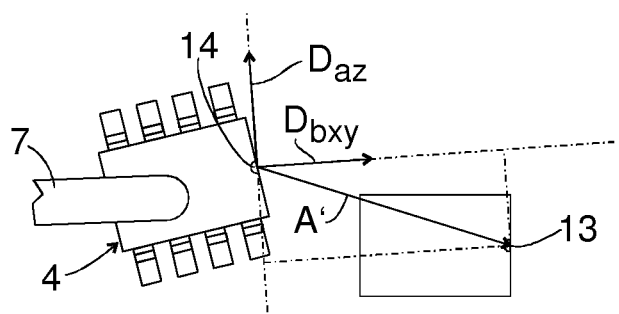
FIG. 3 illustrates standard displacements of a reference point of the robot system.
Figure 4:
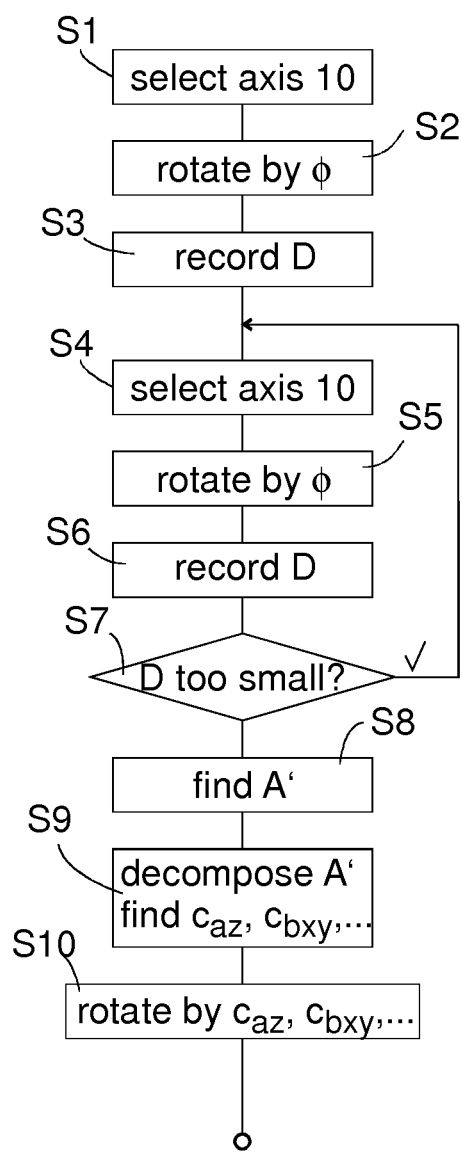
FIG. 4 is a flowchart of a method of controlling the robot arm.

The controller 3 detects a displacement $D_{az}$ of reference point 14 caused by the rotation of step S2 in images from camera 2 (S3). Like A', the displacement $D_{az}$ is a two-dimensional vector in the image plane (cf. FIG. 3).

In a next step S4, the controller 3 selects another axis, e.g. axis 10$bxy$, and drives a rotation around this axis by a small angle $\phi_{bxy}$ in step S5. As pointed out above, $\phi_{bxy}$ can be equal to $\phi_{az}$, or it can be chosen inversely proportional to the distance of end effector 7 from axis 10 $bxy$, so that the distance travelled by end effector 7 will be similar to that in case of rotation around axis 10$az$, but the direction of travel will be different, and the camera 2 observes in step S6 a displacement $D_{bxy}$ in a direction different from $D_{az}$.

If amount of one of these displacements is substantially less than of the other, it can be concluded that the displacement is substantially in the z' direction and can therefore not be seen by the camera 2. Since the camera 2 views the circuit board 5 from above, a displacement in the z' direction might hit the circuit board and should be avoided. Therefore, if the displacement observed in a given rotation is small, the rotation is discarded (S7), and another axis is selected by returning to step S4. A rotation may also be discarded if the direction of its observed displacement D differs by less than a predetermined angle from the direction of the displacement observed due to another rotation.

When the amounts of the displacements $D_{az}$, $D_{bxy}$ are found to be roughly similar, and/or the angle between their directions sufficiently close to a right angle in step S7, the vector A' is detected based on images from camera 2 (S8), and is decomposed into a weighted sum of these displacements in step S9:

$$A'=C_{az}*D_{az}+C_{bxy}*D_{bxy}.$$

By having the robot arm 1 rotate by an angle $C_{az}*\phi_{az}$ around axis 10$az$ and by an angle $C_{bxy}*\phi_{bxy}$ around axis 10$bxy$ (S10), reference point 14 is placed immediately above target point 13.

In an alternative embodiment, the controller 3 repeats steps S4-S6 until the robot arm 1 has carried out rotations $\phi$ around all of its axes 10 and displacements D in the image plane resulting from these have been recorded. Those two displacements $D_1$, $D_2$ whose vector product is largest is chosen for decomposing the vector A' into a weighted sum $$A'=C_1*D_1+C_2*D_2,$$

and then rotating the robot arm 1 by angles $C_1*\phi_1$, $C_2*\phi_2$ around the axes associated to these displacements.

The controller 3 is capable of coordinating rotations around axes 10$ax$, 10$bxy$, 10$cxy$ so that the end effector 7 is displaced along a straight line in a purely radial direction with respect to axis 10$az$. Therefore, in a preferred embodiment of the invention, the controller 3 carries out steps S1-S3 as described above, whereby the robot arm is rotated around axis 10$az$ by $\phi_{az}$, and the reference point 14 experiences a displacement $D_{az}$. In steps S4-S6 it selects as a degree of freedom translation in the radial direction with respect to axis 10$az$, and drives a translation of the end effector 7 in the radial direction, by which the reference point is displaced by $D_r$.

Seen from above by camera 2, the two displacement vectors $D_{az}$ and $D_r$ are approximately orthogonal. A decomposition of vector A' can be carried out (S9):

$$A'=C_{az}*D_{az}+C_r*D_r,$$

and by rotating the robot arm 1 by $C_{az}*\phi_{az}$ around axis 10$az$ and stretching or contracting it radially by an amount proportional to $C_r$ (S9), the reference point 14 is placed on top of target point 11.

In case of the circuit component 4, it is not sufficient that the reference point 14 and the target point 11 coincide, orientations of the casing 15 and the outline 17 must match, too. In the present example, controller 3 "knows" without having recourse to images from camera 2 that such an alignment requires a rotation by axis 10$cz$, it may not know the angle by which the end effector and the circuit component 4 have to be rotated. Therefore, in a preparatory step S0, based on images from the camera 2, controller 3 determines the angle α' and rotates the end effector 7 and the circuit component 4 around axis 10$cz$ by α', so that the edges of the casing 15 become parallel to those of the outline 17. Steps S1-S9 as described above follow.

When the circuit component 4 has been placed correctly above outline 17, the controller lowers the circuit component 4 until its contact with the circuit board prevents further displacement of the robot arm 1 (S10). The lowering movement can again be controlled without having recourse to images from the camera 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 robot arm
2 camera
3 controller
4 circuit component
5 circuit board
6 base
7 end effector
8 link
9 joint
10 axis (of rotation)
11 optical axis
12 supply
13 target position
14 reference point
15 casing
16 contact
17 outline

What is claimed is:

1. A method for visually controlling a robot arm which is displaceable in a plurality of degrees of freedom, the robot arm carrying at least one displaceable reference point, the method comprising the steps of:
   a) placing at least one camera so that a target point where the reference point is to be placed is contained in an image output by the at least one camera;
   b) displacing the robot arm so that the reference point is within the image;
   c) determining a vector which, in the image, connects the reference point to the target point;
   d) choosing one of the plurality of degrees of freedom, moving the robot arm by a predetermined standard distance in the one degree of freedom, and recording a standard displacement of the reference point within the image resulting from the movement of the robot arm;
   e) repeating step d) at least until the vector can be decomposed into a sum of standard displacements times associated weighting factors; and
   f) moving the robot arm by the weighting factors times the standard distances associated with the standard displacements of the sum.

2. The method of claim 1, wherein the degrees of freedom comprise displacements in mutually orthogonal directions.

3. The method of claim 1, wherein the robot comprises rotatable joints and the plurality of degrees of freedom comprise rotations of the joints.

4. The method of claim 1, wherein step d) is carried out for all of the plurality of degrees of freedom of the robot arm.

5. The method of claim 1, wherein a field of view of the at least one camera covers a surface, and the degree of freedom chosen in step d) is parallel to the surface.

6. The method of claim 1, wherein each of the plurality of degrees of freedom is directed substantially along an optical axis of the at least one camera if its standard displacement is below a predetermined threshold, and a weighted sum of step d) comprises no addends associated with a degree of freedom directed substantially along the optical axis.

7. The method of claim 1, wherein the robot arm carries a second displaceable reference point, and
   wherein the vector comprises a rotation component specifying a rotation by which a line extending between first and second reference points is made parallel to a line extending between the first and a second target point.

8. The method of claim 1, wherein the reference point is on an object manipulated by the robot arm.

9. The method of claim 8, wherein the object comprises a circuit component and the target point is on a circuit board.

10. A robot system, comprising:
    a robot arm carrying at least one displaceable reference point;
    at least one camera placed so that a target point where the at least one displaceable reference point is to be placed is contained in an image output by the at least one camera; and
    a controller coupled to the robot arm and the at least one camera,
    wherein the controller is programmed to carry out steps b) to f) of the method of claim 1.

11. A computer program product, comprising:
    program code means which enable a computer to operate as the controller of the robot system of claim 10, wherein the robot system comprises:
    a robot arm carrying at least one displaceable reference point; and
    at least one camera placed so that a target point where the at least one displaceable reference point is to be placed is contained in an image output by the at least one camera.

12. A computer program product, comprising:
    program code means which, when executed, in a robot system, comprising:
    a robot arm carrying at least one displaceable reference point;

at least one camera placed so that a target point where the at least one displaceable reference point is to be placed is contained in an image output by the at least one camera; and a controller coupled to the robot arm and the at least one camera, by the controller, enable a computer to carry out steps b) to f) of the method according to claim 1.

13. A computer-readable data carrier, having program instructions stored on it which, when executed, in a robot system, comprising:

a robot arm carrying at least one displaceable reference point;

at least one camera placed so that a target point where the at least one displaceable reference point is to be placed is contained in an image output by the at least one camera; and a controller coupled to the robot arm and the at least one camera, by the controller, enable a computer to carry out steps b) to f) of the method of claim 1.

\* \* \* \* \*